United States Patent
Doyle et al.

(10) Patent No.: US 12,542,225 B2
(45) Date of Patent: Feb. 3, 2026

(54) SUPERCONDUCTING CABLE SYSTEM

(71) Applicant: Supernode LTD, Dublin (IE)

(72) Inventors: Stephen Doyle, Dublin (IE); Deon Volschenk, Dublin (IE); Marcos Acin, Dublin (IE); Eoin Hodge, Dublin (IE)

(73) Assignee: Supernode LTD, Dublin (IE)

( * ) Notice: Subject to any disclaimer, the term of this patent is extended or adjusted under 35 U.S.C. 154(b) by 0 days.

(21) Appl. No.: 18/711,217

(22) PCT Filed: Nov. 18, 2022

(86) PCT No.: PCT/EP2022/082449
§ 371 (c)(1),
(2) Date: May 17, 2024

(87) PCT Pub. No.: WO2023/089118
PCT Pub. Date: May 25, 2023

(65) Prior Publication Data
US 2025/0014783 A1    Jan. 9, 2025

(30) Foreign Application Priority Data
Nov. 19, 2021   (EP) .................... 21209191

(51) Int. Cl.
*C09K 19/38*    (2006.01)
*H01B 12/16*    (2006.01)

(52) U.S. Cl.
CPC ............. *H01B 12/16* (2013.01); *C09K 19/38* (2013.01)

(58) Field of Classification Search
CPC .... C09K 19/38; C09K 19/3809; H01B 12/16; Y02E 40/60

USPC ........................................... 174/155
See application file for complete search history.

(56) References Cited

U.S. PATENT DOCUMENTS

| | | | | |
|---|---|---|---|---|
| 6,414,575 B1* | 7/2002 | Swift | ................. | H01H 71/2481 335/172 |
| 2002/0172021 A1* | 11/2002 | Seri | ......................... | H01L 24/17 257/E23.077 |
| 2008/0293999 A1* | 11/2008 | Halahmi | ............. | B29C 66/5221 600/101 |
| 2013/0046036 A1* | 2/2013 | Lebel | ....................... | C08K 7/06 524/130 |

(Continued)

FOREIGN PATENT DOCUMENTS

| | | |
|---|---|---|
| CN | 101891938 A | 11/2010 |
| WO | 2011112485 A1 | 9/2011 |

OTHER PUBLICATIONS

Analysis of permeability of CO2; O2; and Ni2 in LCP_Kawasaki et al._pp. 40-51_Aug. 2010*

(Continued)

*Primary Examiner* — Timothy J Thompson
*Assistant Examiner* — Guillermo J Egoavil
(74) *Attorney, Agent, or Firm* — Leech Tishman Fuscaldo & Lampl, LLC

(57) ABSTRACT

The present invention provides a superconducting cable system designed to facilitate long distance superconducting, the cable system including at least one inner cryostat containing a supply of cryogenic fluid and at least one superconductor extending longitudinally of the inner cryostat and in thermal communication with the cryogenic fluid, the inner cryostat comprising a liquid crystal polymer.

20 Claims, 10 Drawing Sheets

(56) References Cited

U.S. PATENT DOCUMENTS

| | | | |
|---|---|---|---|
| 2014/0120282 A1* | 5/2014 | Kim | B29C 45/16 |
| | | | 428/212 |
| 2014/0202765 A1 | 7/2014 | Faulkner | |
| 2021/0091609 A1* | 3/2021 | Maeda | H02K 15/12 |
| 2022/0183187 A1* | 6/2022 | Kelley | H05K 7/20518 |

OTHER PUBLICATIONS

All About Liquid-Crystal Polymer_McClements_pp. 1-6_May 2022.*
Analysis of permeability of $CO_2$; $O_2$; and $Ni_2$ in LCP_Kawasaki et al._ pp. 40-51_Aug. 2010.*
Cryostat Design_CERN-Parma_353 to 399_2014.*
Intro-to-LCP-V1R1_Bigham-Zeus_ pp. 1-20_2016.*
LCP-027_VectraLCPDesignGuideTG_AM_0613_Celanese_pp. 1-80_2013.*
Optimization for the Design of HVDC_Anton_pp. 1-18_Dec. 2020.*
The-Art-of-Cryogenics Part 3_Ventura et al. pp. 55 to 87_2008.*
T. Tanaka, Insight into Technologies in Electrical Insulation Toward the Middle of the 21st Century, Waseda University, Central Research Institute of Electric Power Industry, Komae-shi, Toyko 201-8511 Japan, Nov. 19, 2001, 10 pages.
D. Rosato, J. Murphy, Reinforced Plastic Handbook, Dec. 31, 2004, 1098 pages.
Celanese, Vectra Liquid Crystal Polymer (LCP) Design Guide, Jan. 15, 2014, 80 pages.
International Search Report and Written Opinion dated Feb. 10, 2023 for corresponding International Application No. PCT/EP2022/082449; International Filing Date: Nov. 18, 2022 consisting of 9-pages.

* cited by examiner

SUPERCONDUCTING CABLE SYSTEM

CROSS-REFERENCE TO RELATED APPLICATIONS

This application is a Submission under 35 U.S.C. § 371 for U.S. National Stage Patent Application of, and claims priority to, International Application Number PCT/EP2022/082449, entitled A SUPERCONDUCTING CABLE SYSTEM, filed Nov. 18, 2022, which is related to and claims priority to European Patent Number 21209191.2, filed Nov. 19, 2021, the entirety of all of which are incorporated herein by reference.

FIELD OF THE INVENTION

This invention relates to a superconducting cable system utilising at least one liquid crystal polymer cryostat.

BACKGROUND OF THE INVENTION

The current state of the art in the design of high temperature superconductor (HTS) power cables includes the use of metallic alloy cryostats, typically of corrugated tubing, adopted from adjacent industrial uses such as liquid nitrogen gas (LNG) transfer solutions, to host HTS power cables and transmit pressurised cryogenic fluid to cool the HTS materials.

The metallic alloys are not efficient thermally and are not electrical insulators. This introduces challenges in the design and reliability of the cryostat system and HTS power cable. The conventional cross section of a HTS power cable system includes an inner corrugated tube arranged concentrically within the outer corrugated tube. The metallic alloy cryostats are designed to mechanically resist external mechanical loading and support a HTS power cable and cryogenic fluid within the inner corrugated tube. The corrugated profile tubing caters for the deficiencies in performance of metallic alloys including the Coefficient of Thermal Expansion (CTE) which results in the metallic alloy contracting both longitudinally and radially in dimension. These corrugations in the Inner corrugated tube result in significant pressure losses in the flow of cryogenic fluid, resulting in shorter longitudinal lengths of HTS power cable systems before re-pressurisation of the cryogenic fluid is needed.

Due to the metallic alloy characteristics, the HTS power cable must include independent dielectric insulation, typically of polypropylene laminated paper (PPLP) with liquid nitrogen (LN2), or equivalent, with a layer thickness proportional to the PPLP & LN2 dielectric strength and HTS power cable voltage. The dielectric may alternatively be added to the exterior of the corrugated cryostats, using conventional insulation such as cross linked polyethylene (XLPE). The need for the HTS power cable to have independent dielectric insulation layers results in the HTS power cable having a larger outer diameter, thus inferring that in many embodiments the inner corrugated tube must have a larger diameter to host the HTS power cable and sufficient cryogenic fluid to achieve a target mass flow rate to cool the HTS material.

In summary, the primary design issues and inefficiencies with state-of-the-art HTS power cable systems include:
Limited or single function layers within the cable system, for example, separate dielectric insulation on the conductor, and metallic cryostats to enclose a vacuum and cryogenic fluid;
Corrugated metallic cryostats resulting in heat ingress, additional turbulence generation in liquid cryogenic fluids and thus additional heat generation, higher pressure losses accumulated over shorter distances thus needing more pressurisation points on the HTS power cable system, and high friction factor heat generation in the cryogenic fluid;
Larger diameter cryostats required to host multi-layered HTS conductors resulting in greater radiative heat ingress;
High rates of thermal contraction and expansion with changes in temperature.
Complex manufacturability and associated costs;
Non-corrugated steel cryostats suffer from reliability and associated mobilisation and installation complexity.

There are currently no long-distance HTS power cables in operation. The longest is currently a project in development at 12 km which will use the conventional HTS power cable configuration described using corrugated steel cryostat. For short HTS power cable runs, extruded aluminium tubes or stainless-steel inner cryostat smooth-bore tubes can be used, or lined corrugated cryostats. Smooth-bore stainless steel cryostats are the most common technology for terrestrial particle accelerators or LNG transfer pipes. These are typically installed with rolling or expansion devices to accommodate thermal contraction.

Alternatively, Invar (FeNi36) which is a nickel-iron alloy notable for its uniquely low CTE would allow for a smooth bore solution without having to accommodate thermal expansion upon cooling. Typical metallic alloys like stainless steel and aluminium suffer from larger coefficient of thermal expansion/contraction values resulting in requirements for multiple bellows-based expansion joints to offset the longitudinal contraction of the metallic tubes when filled with cryogenic fluid. These joints introduce failure points and thermal leak paths in the system thus undermining reliability.

The metallic alloys and carbon fibre composites conventionally employed are electrical and thermal conductors. Therefore, insulation layers are needed which increase the overall dimensions of the cryostat. Thermo-hydraulic performance and costs are negatively affected.

All smooth-bore metallic cryostats cannot be continuously manufactured, and need to be welded in straight sections of around 12 meters. They cannot be reeled into a coil for transport. This increases the cost of manufacturing, transportation and deployment of such systems. A carbon fibre thermoset cryostat cannot be reeled due to its high stiffness.

Corrugated metallic cryostats generate additional turbulence and friction with the liquid cryogenic fluids thus additional heat generation and higher-pressure losses accumulated over shorter distances thus needing more pressurisation points on the HTS power cable system. Long distance SCS with corrugated IC are technically unfeasible.

Carbon fibre thermoset composites are known to develop cracks within the material when subjected to cryogenic environments. These cracks represent a permeability leak for the cryogenic liquid into the vacuum chamber potentially disrupting the SCS operation.

Thus at the present time existing technologies are economically and technically unfeasible for long distance SCS deployment (i.e. 100 km lengths).

It is therefore an object of the present invention to overcome the above mentioned shortcoming of the prior art by providing an improved superconducting cable system capable of operating over long distances without significant performance degradation.

SUMMARY OF THE INVENTION

According to a first aspect of the present invention there is provided a superconducting cable system comprising at least one inner cryostat; a supply of cryogenic fluid within a lumen of the at least one inner cryostat; and at least one superconductor extending longitudinally of the at least one inner cryostat and in thermal communication with the cryogenic fluid; wherein the at least one inner cryostat comprises a liquid crystal polymer.

Preferably, the liquid crystal polymer comprises a thermotropic liquid crystal polymer.

Preferably, the liquid crystal polymer comprises an aromatic ester comprising aromatic dicarboxylic repeating units and/or aromatic hydroxycarboxylic repeating units and/or repeating units derived from aromatic diols, aromatic amides and/or non-aromatic monomers.

Preferably, the liquid crystal polymer comprises at least one filler.

Preferably, the at least one filler is selected from zirconium tungstate, chopped glass fibres, chopped PTFE fibres, chopped carbon fibres, chopped liquid crystal polymer fibres, carbon nanofibers, aramid nanofibers, nanotubes, boron nitride and graphene nanoparticles.

Preferably, the one or more fillers comprise from 0.1% to 40% of the volume of the liquid crystal polymer.

Preferably, the liquid crystal polymer has a coefficient of thermal expansion of less than 10 e$^{-6}$/C.

Preferably, the liquid crystal polymer has a permeability of less than $1\times10^{-12}$ cm$^3$·cm/cm$^2$/s/bar, as measured for nitrogen gas at room temperature.

Preferably, the liquid crystal polymer has a dielectric strength of between 0 kV/mm and 40 kV/mm.

Preferably, the liquid crystal polymer has a failure strain at break of between 1% and 20%.

Preferably, the liquid crystal polymer has a minimum service temperature of between 4 and 90 degreed Kelvin.

Preferably, the liquid crystal polymer has a thermal conductivity of less than 0.5 W/mk.

Preferably, the liquid crystal polymer has a yield strength of greater than 25 MPa.

Preferably, the liquid crystal polymer has a stiffness of between 1 GPa and 100 GPa.

Preferably, the at least one superconductor is in retained within a lumen of the at least one inner cryostat.

Preferably, the cable system comprises a first inner cryostat and a second inner cryostat surrounding the first inner cryostat.

Preferably, the second inner cryostat comprises a liquid crystal polymer.

Preferably, the first and/or second inner cryostat comprises a smooth bore.

Preferably, the cable system comprises an outer cryostat enclosing the at least one inner cryostat.

Preferably, the cable system comprises a centraliser positioned between the outer cryostat and the at least one inner cryostat.

Preferably, the cable system comprises one or more layers of thermal and/or electrical insulation.

Preferably, one or more of the layers comprise thermal insulation comprising one or more of aerogel, nano-porous insulation, solid insulation, layered composite insulation, multilayer insulation, an insulation blanket and vacuum.

Preferably, the superconductor comprises a multiphase superconductor.

Preferably, the superconductor comprises multiple discrete superconducting elements.

Preferably, the superconducting elements are coaxially arranged and electrically insulated from at least adjacent superconducting elements.

Preferably, the superconducting elements are arranged in a circular array coaxial with the at least one inner cryostat.

Preferably, the cryogenic fluid comprises liquid hydrogen, liquid nitrogen, liquid helium and/or any other suitable cryogen.

According to a second aspect of the present invention there is provided a cryogen conduit comprising at least one inner cryostat; a supply of cryogenic fluid within a lumen of the at least one inner cryostat; wherein the at least one inner cryostat comprises a liquid crystal polymer.

Preferably, the liquid crystal polymer comprises a thermotropic liquid crystal polymer.

Preferably, the liquid crystal polymer comprises an aromatic ester comprising aromatic dicarboxylic repeating units and/or aromatic hydroxycarboxylic repeating units and/or repeating units derived from aromatic diols, aromatic amides and/or non-aromatic monomers.

Preferably, the liquid crystal polymer has a coefficient of thermal expansion of less than 10 e$^{-6}$/C.

Preferably, the liquid crystal polymer has a permeability of less than $1\times10^{-12}$ cm$^3$·cm/cm$^2$/s/bar, as measured for nitrogen gas at room temperature.

Preferably, the liquid crystal polymer has a dielectric strength of between 0 kV/mm and 40 kV/mm.

Preferably, the liquid crystal polymer has a failure strain at break of between 1% and 20%.

Preferably, the liquid crystal polymer has a minimum service temperature of between 4 and 90 degreed Kelvin.

Preferably, the liquid crystal polymer has a thermal conductivity of less than 0.5 W/mk.

Preferably, the liquid crystal polymer has a yield strength of greater than 25 MPa.

Preferably, the liquid crystal polymer has a stiffness of between 1 GPa and 100 GPa.

Preferably, the cryogen conduit comprises a first inner cryostat and a second inner cryostat surrounding the first inner cryostat.

Preferably, the second inner cryostat comprises a liquid crystal polymer.

Preferably, the first and/or second inner cryostat comprises a smooth bore.

BRIEF DESCRIPTION OF THE DRAWINGS

The present invention will now be described with reference to the accompanying drawings, in which.

DETAILED DESCRIPTION OF THE DRAWINGS

Figure 1:
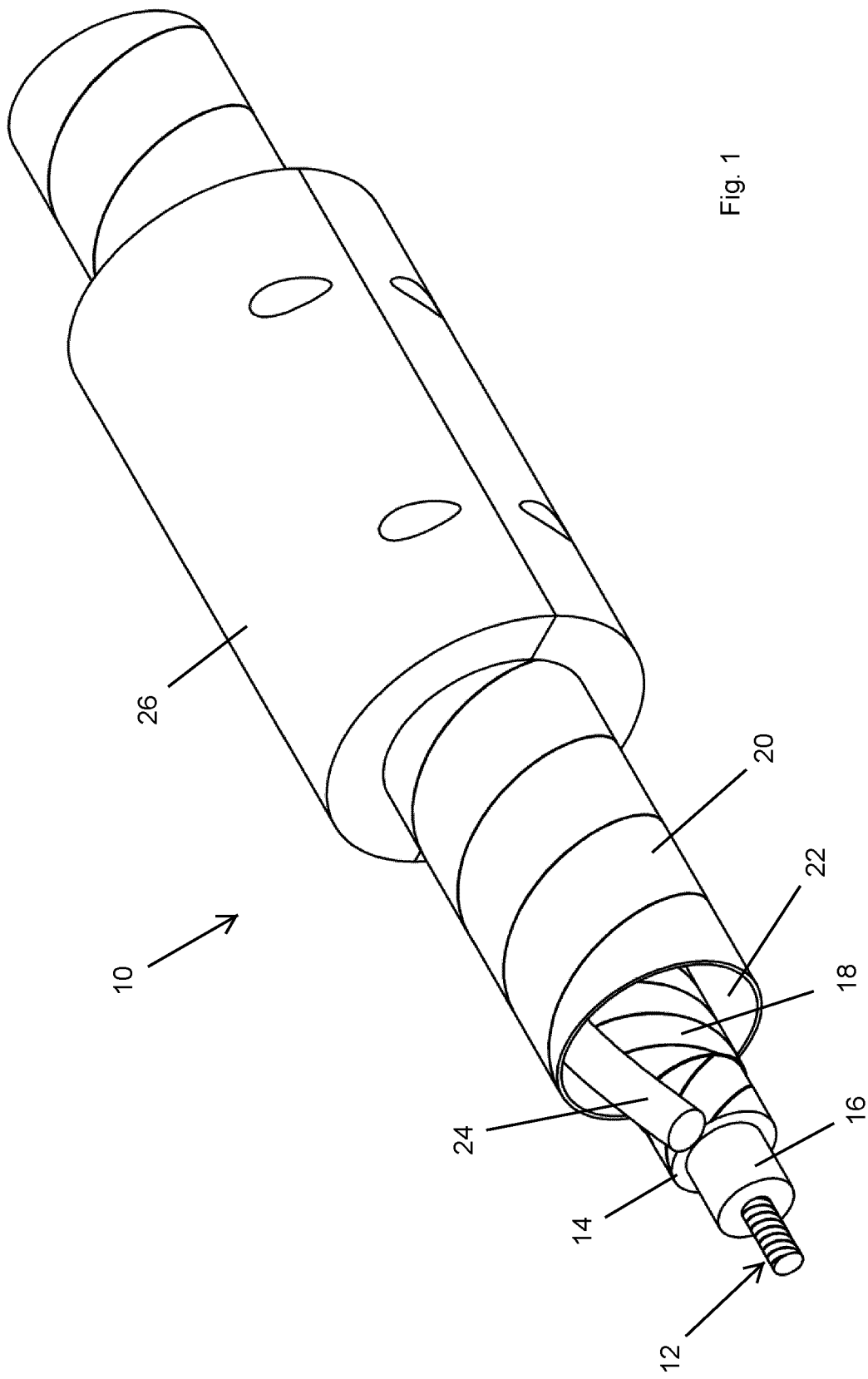
FIG. 1 illustrates a perspective view of a superconducting cable system according to a first embodiment of the present invention.

Referring now to FIG. 1 of the accompanying drawings there is illustrated a superconducting cable system, generally indicated as 10, for use is providing long distance superconducting capabilities while avoiding or significantly reducing the issues associated with such applications of superconducting technology as detailed above.

The cable system 10 comprises a superconductor 12 which may be of any known suitable material, and may comprise a single component or multiple components, for example an array or arrangement of superconducting ribbons or the like. The superconductor 12 may be configured to conduct single pole or multipole direct current (DC) or single phase or multiphase alternating current (AC), and may be physically arranged on concentric axes (for example a tri-axis arrangement in a three phase system) or adjacent axes (a tri-ad arrangement for a three phase system). For AC systems, a so called high temperature superconductor (HTS) or other conductive material or neutral conductor may be added while for AC or DC systems one or more forms of magnetic shielding layers may be added, as exemplified in embodiments described hereinafter.

The superconductor 12 extends longitudinally within a central lumen of an inner cylindrical cryostat 14 which, in use, is at least partially filled with a cryogenic fluid (cryogen) 16, for example liquid hydrogen, nitrogen, helium, although it is envisaged that any other liquid, gaseous or multiphase cryogens or combinations of cryogens may be utilised. In this way the superconductor 12 is in thermal communication with the cryogen 16 in order to maintain the requisite cryogenic temperature required for superconductivity. Although in the embodiment illustrated the superconductor 12 is in direct contact with the cryogen 16 in order to establish thermal communication, it is also possible, as illustrated in later embodiments, that indirect contact between the superconductor and cryogen may still provide the necessary thermal communication. The operating temperature of the cryogen 16 may vary depending on the operating requirements and/or conditions of the cable system 10 or additional or alternative parameters, and for example where liquid nitrogen is used as the cryogen 16 the operating temperature may be in the range of 67° K to 77° K at an operating pressure of between 0 bar and 25 bar. It should however be understood that these are exemplary parameters and lower or higher temperatures and/or pressures may be employed. It should also be understood that the superconductor 12 could be arranged for example eccentrically or extend helically or the like, while still extending longitudinally relative to the overall length of the cable system 10.

The cable system 10 additionally comprises a layer of thermal insulation 18 surrounding the inner cryostat 14, and an outer cryostat 20 surrounding and enclosing the foregoing components. A vacuum annulus 22 is defined between the inner cryostat 14 and the outer cryostat 20 to provide additional thermal insulation. The vacuum drawn in the vacuum annulus 22 reduces thermal convection in the cable system 10, and in the embodiment illustrated may be in the range of between 1 and 1000 Pa, although alternative vacuum levels may be employed, for example a hard or soft vacuum. A centralising element 24 may be provided in the vacuum annulus 22 in order to physically maintain the correct position of the inner cryostat 14 concentrically or otherwise with the outer cryostat 20, preferably to ensure a uniform vacuum annulus 22. The outer cryostat 20 provides environmental protection to the cable system 10, reduces thermal losses, avoids permeation of contaminants such as particulate matter and provides structural containment against the surrounding environment, which may for example be a body of water exerting significant pressure on the outer cryostat 20. The outer cryostat 20 is preferably a multilayer construction comprising a smooth bore steel pipe or corrugated steel jacket for environmental protection. Alternatively the outer cryostat 20 may comprise a polymer pipe with one or more optional electrical insulation layers (not shown) and/or a permeation barrier layer that may for example be metallic. The centralising element 24 may be of any suitable shape, configuration and material, and in the embodiment illustrated is helical in shape in order to extend around the circumference of the annulus 22. Finally, the cable system 10 may be provided with external ballast 26, for example where the cable system 10 is to be deployed underwater such as in subsea applications to ensure the cable system 10 sinks to the seabed.

The primary function of the inner cryostat 14 is to contain the cryogen 16 and to facilitate thermal communication between superconductor 12 and the cryogen 16, which in the case of the embodiment of FIG. 1 is achieved by locating the superconductor 12 within the lumen of the cryostat 14 and therefore is direct contact with the cryogen 16. The cryostat 14 must also provide structural integrity against the pressurized cryogen 16, act as a dielectric insulator for the cable system 10 from the superconductor 12, act as a thermal insulator to minimize heat ingress from the exterior and act as a permeability barrier between the cryogen 16 and the vacuum annulus 22.

In addition, to facilitate design and transportation while minimising the cost of the cable system 10, the inner cryostat 14 must have a low coefficient of thermal expansion (CTE) to avoid or reduce the use of conventional bellows based expansion joints, be capable of being spooled into reels, and be capable of being manufactured in long lengths, for example 1 km or longer, preferably 10 km or longer.

In order to achieve said performance and manufacturing characteristics, the inner cryostat 14 is comprised of a liquid crystal polymer (LCP). LCPs are quite different from conventional polymers. They have properties that include low melt viscosity, fast cycle time in molding, very low mold shrinkage, excellent mechanical properties, solvent resistance, excellent barrier properties, low water absorption, low thermal expansion coefficient, excellent thermostability, low flammability, etc. Therefore, they have been explored for numerous applications, for example high-strength and highmodulus fibres, precision molded small components and films exhibiting excellent barrier properties.

Compared to monomer liquid crystals, polymer liquid crystals can display similar behaviours, and be classified into thermotropic and lyotropic LCPs. Several well known classes of polymers including polyesters, polyethers and polyamides can exhibit liquid crystalline phases. According to different mesogen positions in the polymer, LCPs can be defined as main chain, side chain and combined LCPs, with more complex structures possible. Aromatic rings are the most common units used in LCPs.

Thermotropic main chain LCPs are the most important group of LCPs. They consist of mesogenic groups incorporated into the backbone of the polymer chain, and when prepared without flexible spacers, are usually known as wholly aromatic thermotropic LCPs. Since they form LC phases when melted, the viscosity in the melt state is relatively low, improving processing.

Polyesters are an important group within this class of polymers. Particularly suitable LCPs have a basic structure containing one or more aromatic ester repeating units which may have a general molecular structure including a ring of substituted or unsubstituted 6-membered aryl group or alternatively a substituted or unsubstituted 6-membered aryl group fused to a substituted or unsubstituted 5- or 6-membered aryl group, or a substituted or unsubstituted 6-membered aryl group linked to a substituted or unsubstituted 5- or 6-membered aryl group. The molecular structure may have one or more side groups. Exemplary aromatic ester repeating units are aromatic dicarboxylic repeating units, aromatic hydroxycarboxylic repeating units and combinations thereof. The aromatic units may be in an amount of from 60 mol. % to 99.9 mol. %

The aromatic dicarboxylic repeating units may be derived from aromatic dicarboxylic acids. Suitable aromatic dicarboxylic acids are terephthalic acid, diphenyl ether-4,4'-dicarboxylic acid, bis(4-carboxyphenyl) ether, bis(4-carboxyphenyl) butane, bis(4-carboxyphenyl) ethane, bis(3-carboxyphenyl) ether, bis(3-carboxyphenyl) ethane isophthalic acid, 2,6-naphthalenedicarboxylic acid, 1,6-naphthalenedicarboxylic acid, 2,7-naphthalenedicarboxylic acid, 4,4'-dicarboxybiphenyl.

The aromatic hydroxycarboxylic repeating units may be derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid and alkyl, alkoxy, aryl and halogen substituents. Exemplary aromatic hydroxycarboxylic acids are 4-hydroxybenzoic acid and 6-hydroxy-2-naphthoic acid.

Repeating units may also be derived from aromatic diols and alkyl, alkoxy, aryl and halogen substituents. Exemplary aromatic diols are 4,4'-biphenol and hydroquinone. Repeating units may also be employed, such as those derived from aromatic amides or aromatic amines. Any repeating units may be substituted variously with alkyl, alkoxy, aryl and halogen substituents.

The LCP may comprise numerous other monomer based repeating units such as dicarboxylic acids, aliphatic or cycloaliphatic hydroxycarboxylic acids, amides, amines or diols.

Examples of suitable commercially available LCPs are Vectra® as manufactured by Celanese Corporation, Laperos® as manufactured by Polyplastics Co. Ltd., Xydar® as manufactured by Solvay, Sumikausper™ as manufactured by Sumitomo Chemical, Siveras™ as manufactured by Toray Industries Inc., Ueno LCP® as manufactured by Ueno Fine Chemcials Industry, Ltd., and Vicryst® as manufactured by Kingfa. Optional fillers may be added to the LCP in order to modify the mechanical, chemical, thermal and/or dielectric properties of the LCP. Such fillers may for example be zirconium tungstate ($ZrW_2O_8$), glass and/or polytetrafluoroethylene (PTFE) and/or carbon short fibres, boron nitride and graphene nanoplatelets, and the fillers may comprise up to 20% by volume of the final LCP used in manufacturing the inner cryostat 14.

The inner cryostat 14 is typically manufactured via an extrusion process into a smooth-bore pipe using the selected LCP and optional filler compounds to fulfil the inner cryostat 14 requirements and to improve the techno-economic feasibility of long-distance HTS power cables. The provision of the smooth bore defining the inner lumen minimises drag on the cryogen 16 and therefore increase the operational length of the cable system 10. Additional manufacturing processes for the inner cryostat 14 include, but are not limited to, pultrusion, tape laying, tape or filamenting winding, fibre placement, waiving, braiding, injection moulding, thermoforming, compression moulding, roll moulding, melt-blending.

Intermediate or inner or outer layers (not shown), typically metal or other composite layers, can be preferentially coextruded with the inner cryostat 14 to improve its technical performance. Other manufacturing methods to include these layers with the inner cryostat 14 are, but not limited to, spraying, bonding with adhesives, welding, thermal bonding, tape laying, wrapping.

The use of LCP for the inner cryostat 14 allows the extrusion of a smooth inner bore with a controllable and preferential/neutral CTE in the longitudinal and radial directions. This avoids the requirement for thermal expansion devices (not shown) and reduces the system pressure losses compared to conventional corrugated cryostats. The LCP has a low thermal conductivity, high dielectric strength and low permeability which facilitates a reduction in the number of insulation layers compared to state-of-the-art alternatives and a decrease in the overall dimensions of the cryostat 14 and therefore optionally the overall cable system 10.

The LCP can be preferentially manufactured through extrusion, as a long length or continuous and inexpensive manufacturing process, into a smooth-bore pipe. The thermoplastic compound of the LCP is tailored to have a combination of properties that allows the LCP to be reeled for storage and transport thereby minimising costs.

One exemplary but non limiting thermoplastic compound of the LCP is tailored with fillers to have high strain failure at break (>3.5%), a strength of 200 MPa and a stiffness of 10 GPa. This combination of properties allows the inner cryostat 14 formed from said LCP to be reeled for storage and transport with a minimum bending radius (MBR) of 0.5-9 m depending on the diameter of the inner cryostat 14.

In general the LCP with said optional modifying fillers is selected to provide the inner cryostat 14 with the following characteristics:

| | |
|---|---|
| Yield Strength [MPa] | Greater than 25 |
| Strength at break {Mpa} | Greater than 50 |
| Stiffness [Gpa] | Between 1-100 |
| Failure Strain at break | Greater than 1% |
| Coefficient of Thermal Expansion Inner Cryostat [μm/mK] | Less than $|10e^{-6}/C|$ |
| Thermal Conductivity [W/mK] | Less than 0.5 |

-continued

| | |
|---|---|
| Dielectric Strength [kV/mm] | Greater than 10 |
| Minimum service temperature [K] | 4 |
| Minimum in-service life-span [years] | 30 |
| Permeability Inner Cryostat (N2 at RT) [cm$^3$/cm · cm$^2$/s/bar] | Less than $1 \times 10^{-12}$ |
| Outgassing [TML %] | Less than 0.5 |

Figure 2:
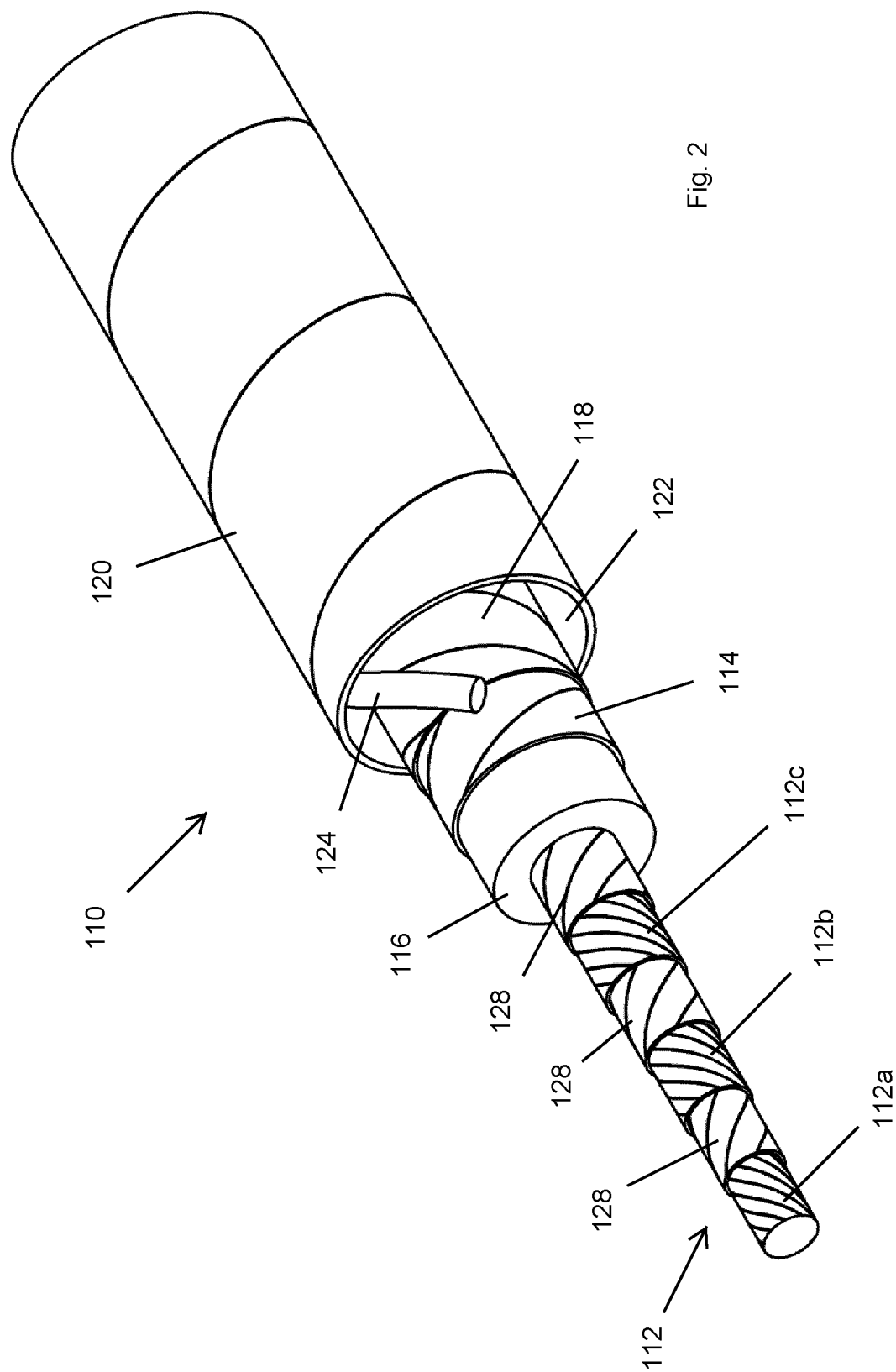
FIG. 2 illustrates a perspective view of a superconducting cable system according to a second embodiment of the present invention.

Referring now to FIG. 2 a second embodiment of a superconducting cable system according to the present invention is illustrated and generally indicated as 110. In this second embodiment like components have been accorded like reference numerals and unless otherwise stated perform a like function.

The cable system 110 comprises a superconductor 112 comprised of an inner superconducting element 112a, a first coaxial superconducting element 112b surrounding the inner element 112a and separated therefrom by a layer insulation 128, and a second coaxial superconducting element 112c surrounding the first coaxial superconducting element 112b and separated therefrom by a layer of insulation 128. This arrangement is selected to conduct three phase AC current. It will of course be understood that a single pole or bi-axial bi-pole DC conductor (not shown) could be used as an alternative. The superconductor 112 is located coaxially within the lumen of an inner cryostat 114 comprising a liquid crystal polymer as hereinbefore described, containing a cryogen 116 in which the superconductor 112 is therefore encapsulated such as to establish thermal communication therebetween. A layer of thermal insulation 118 surrounds the inner cryostat 114, and may be of any suitable form, for example comprising one or more of aerogel, nanoporous insulation, layered composite insulation, multilayer insulation or insulation blanket.

An outer cryostat 120 surrounds the insulated inner cryostat 114, with a vacuum annulus 122 defined between the inner cryostat 114 and the outer cryostat 120 to provide additional thermal insulation. A centralising element 124 may be provided in the vacuum annulus 122 in order to physically maintain the corrected position of the inner cryostat 114 concentrically or otherwise with the outer cryostat 120 such as to ensure a uniform vacuum annulus region.

Figure 3:
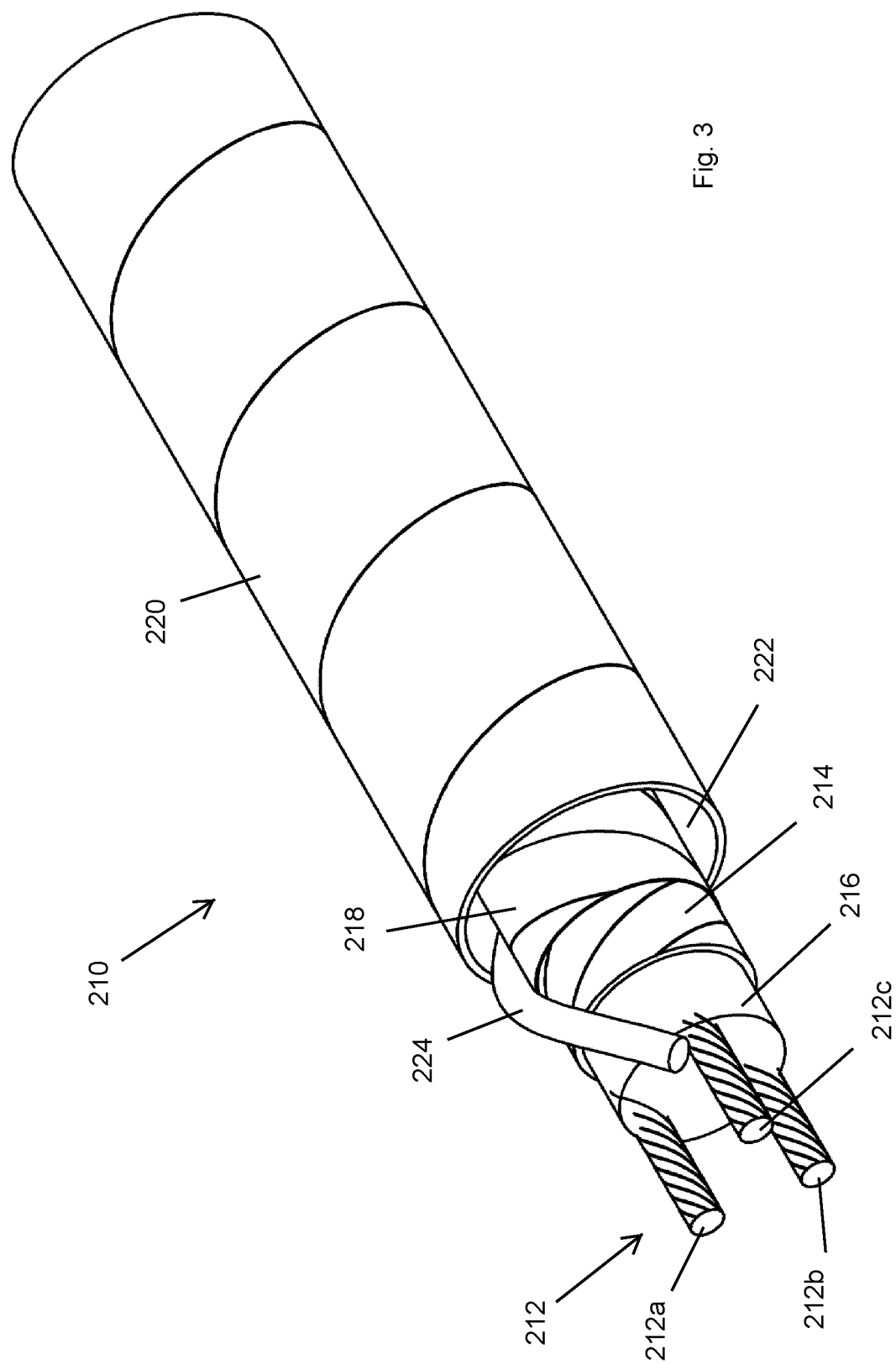
FIG. 3 illustrates a perspective view of a superconducting cable system according to a third embodiment of the present invention.

FIG. 3 illustrates a third embodiment of a superconducting cable system according to the present invention, generally indicated as 210. In this third embodiment like components have been accorded like reference numerals and unless otherwise stated perform a like function.

The cable system 210 comprises a superconductor 212 in a three core tri-axis configuration comprising a first superconducting element 212a, a second superconducting element 212b and a third coaxial superconducting element 212c arranged in a circular array to facilitate three phase AC. The superconductor 212 is located longitudinally within the lumen of an inner cryostat 214 comprising a liquid crystal polymer as hereinbefore described, containing a cryogen 216 surrounding the superconductor 212 to establish thermal communication therebetween. A layer of thermal insulation 218 surrounds the inner cryostat 214, and may be of any suitable form as hereinbefore described.

An outer cryostat 220 surrounds the insulated inner cryostat 214, with a vacuum annulus 222 defined therebetween, and a centralising element 224 may be provided in the vacuum annulus 222.

Figure 4:
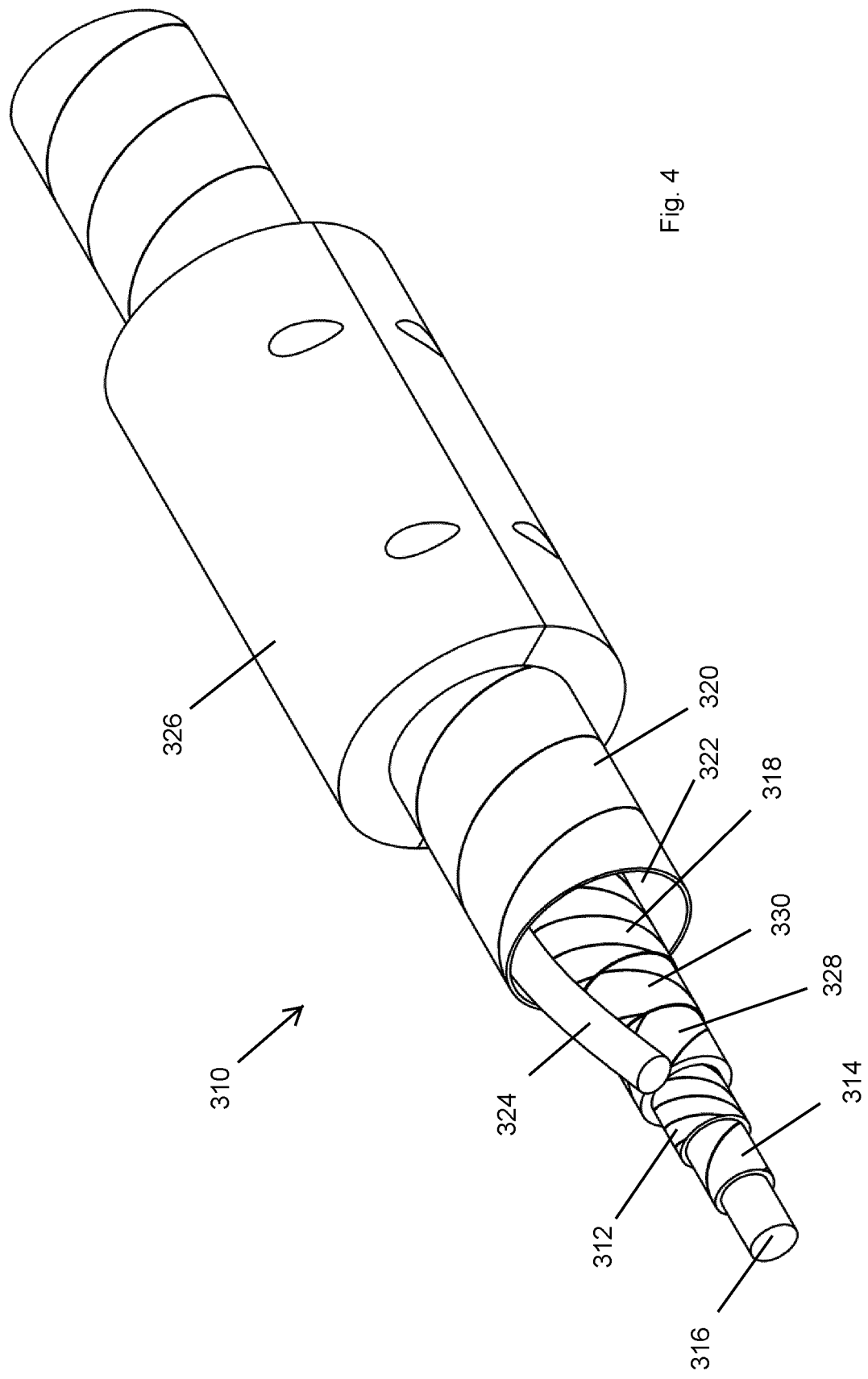
FIG. 4 illustrates a perspective view of a superconducting cable system according to a fourth embodiment of the present invention.

FIG. 4 illustrates a fourth embodiment of a superconducting cable system according to the present invention, generally indicated as 310. In this fourth embodiment like components have been accorded like reference numerals and unless otherwise stated perform a like function.

The cable system 310 comprises a superconductor 312 of tubular form and located longitudinally about an exterior surface of a first inner cryostat 314 in thermal communication therewith, the inner cryostat 314 comprising a liquid crystal polymer as hereinbefore described. The inner cryostat 314 contains a cryogen 316 with which the superconductor 312 is in thermal communication via the inner cryostat 314 which provides structural integrity containing the pressurised cryogen 316 and acting as a permeability barrier.

The cable system 310 additionally comprises a second inner cryostat 330 surrounding the first inner cryostat 314 and again comprising a liquid crystal polymer of suitable composition. However the second inner cryostat 330 may be formed from any suitable alternative material, for example if the second inner cryostat 330 is not subject to internal pressurisation, which may occur purely in the first inner cryostat 314. The second inner cryostat 330 may have a design and dimensions appropriate to the lower structural and mechanical requirements, and may not provide sufficient dielectric strength in isolation, and may simply provide light mechanical protection for the superconductor. Accordingly, an additional electrical and/or mechanical layer 328 may be provided between the superconductor 312 and the second inner cryostat 330.

A layer of thermal insulation 318 outwardly surrounds the second inner cryostat 330, and may be of any suitable form as hereinbefore described. An outer cryostat 320 surrounds the insulated inner cryostats 314 and 330, with a vacuum annulus 322 defined therebetween, and a centralising element 324 may be provided in the vacuum annulus 322. Optional ballast 326 may be provided, preferably about an exterior of the outer cryostat 320.

Figure 5:
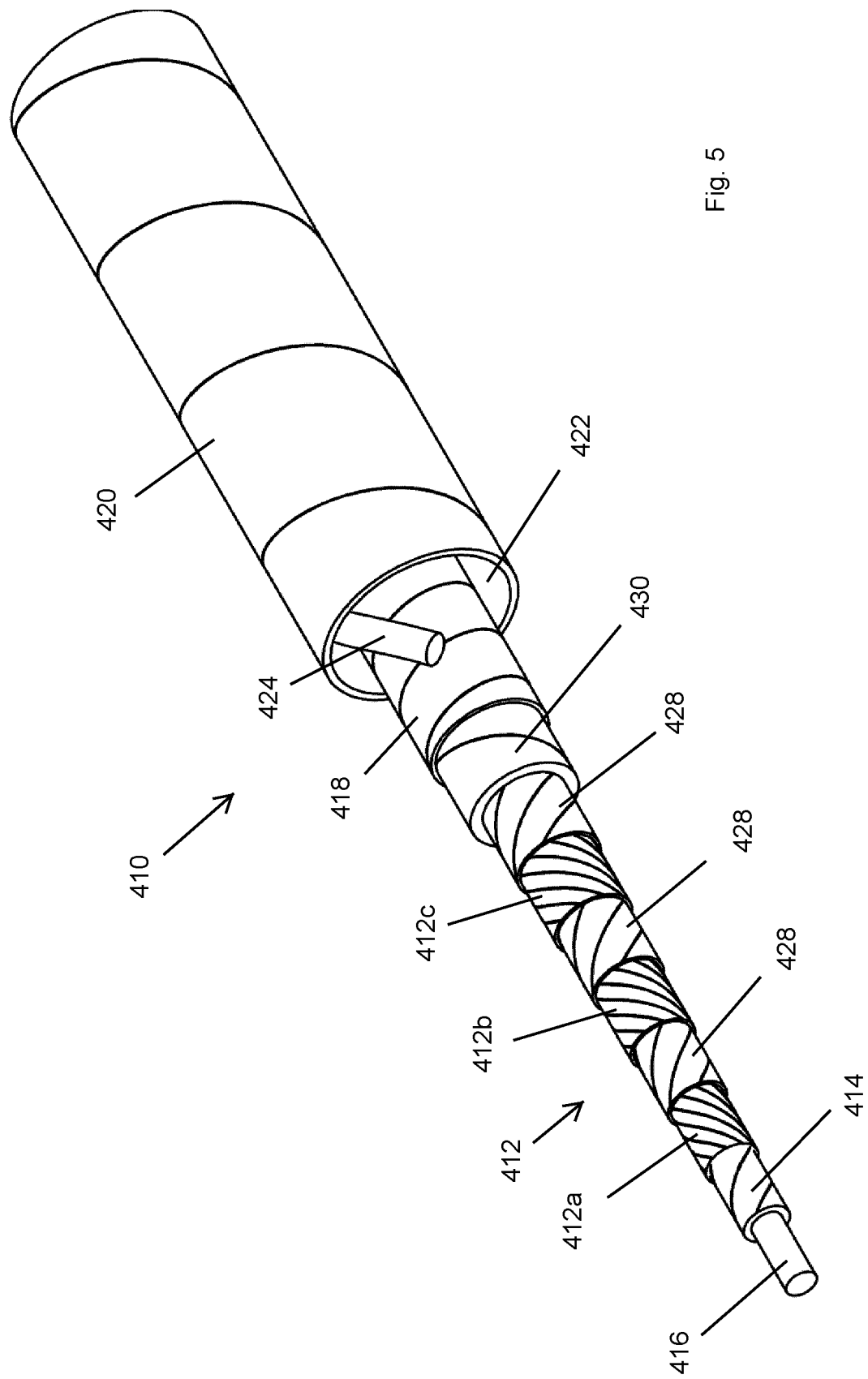
FIG. 5 illustrates a perspective view of a superconducting cable system according to a fifth embodiment of the present invention.

FIG. 5 illustrates a fifth embodiment of a superconducting cable system according to the present invention, generally indicated as 410. In this fifth embodiment like components have been accorded like reference numerals 328 and unless otherwise stated perform a like function.

The cable system 410 is similar to the cable system 310 shown in FIG. 4, but with a three phase co-axial superconductor 412 of tubular form and located longitudinally about an exterior surface of a first inner cryostat 414 in thermal communication therewith, the inner cryostat 414 comprising a liquid crystal polymer as hereinbefore described. The superconductor 412 is comprised of an inner tubular superconducting element 412a, a first tubular and coaxial superconducting element 412b surrounding the inner element 412a and separated therefrom by a layer of insulation 428, and a second tubular coaxial superconducting element 412c surrounding the first coaxial superconducting element 412b and separated therefrom by a further layer of insulation 428. This arrangement is selected to conduct three phase AC current.

The inner cryostat 414 contains a cryogen 416 with which the superconductor 412 is in thermal communication via the inner cryostat 414. The cable system 410 additionally comprises a second inner cryostat 430 surrounding the first inner cryostat 314 and again comprising a liquid crystal polymer of suitable composition or other suitable material. A layer of thermal insulation 418 surrounds the second inner cryostat 430, and may be of any suitable form. An outer cryostat 420 surrounds the insulated inner cryostats 414 and 430, with a vacuum annulus 422 defined therebetween, and a centralising element 424 may be provided in the vacuum annulus 422.

Figure 6:
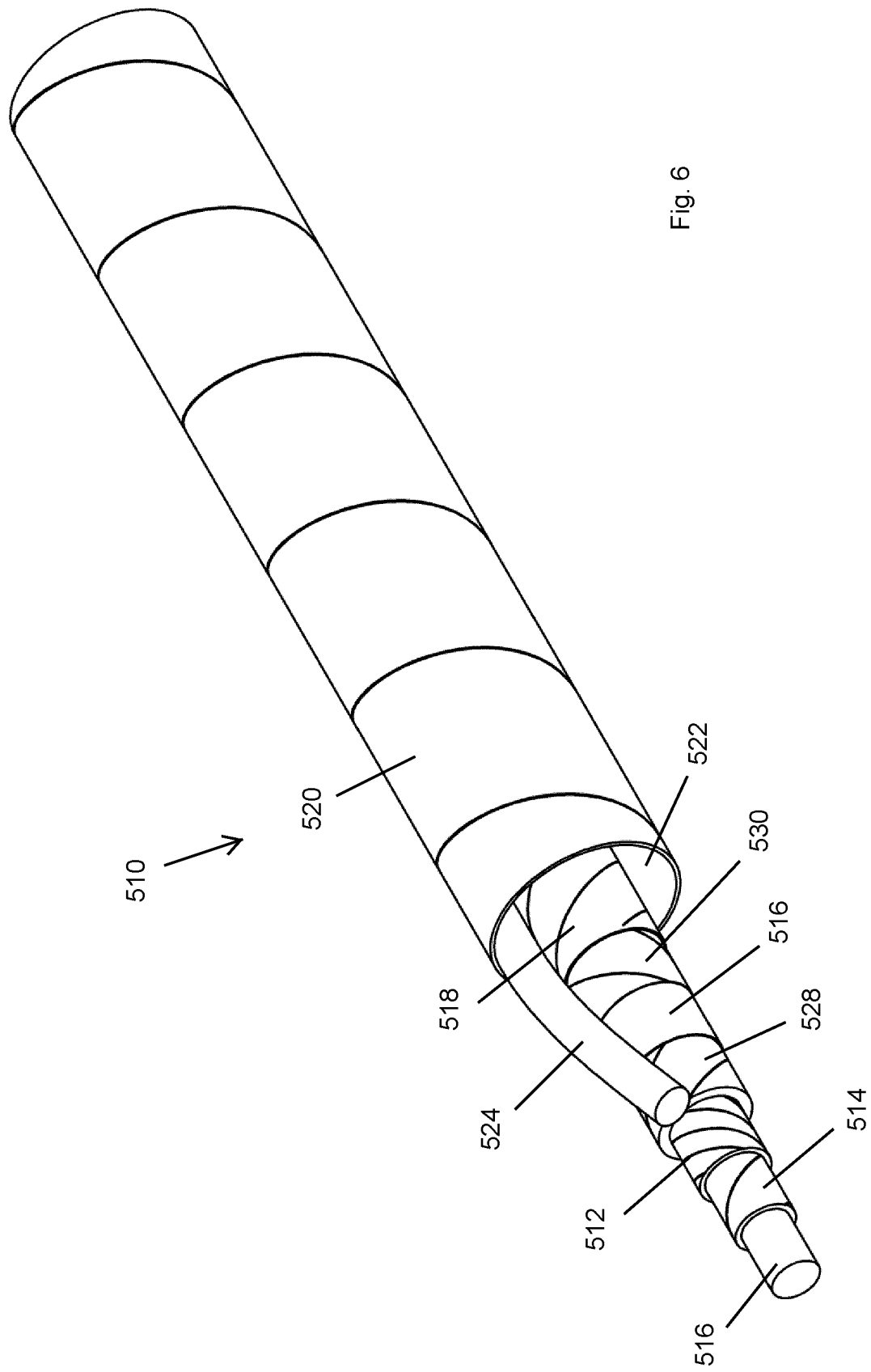
FIG. 6 illustrates a perspective view of a superconducting cable system according to a sixth embodiment of the present invention.

FIG. 6 illustrates a sixth embodiment of a superconducting cable system according to the present invention, generally indicated as 510. In this sixth embodiment like components have been accorded like reference numerals and unless otherwise stated perform a like function.

The cable system 510 comprises a single phase superconductor 512 and located longitudinally about an exterior surface of a first inner cryostat 514 in thermal communication therewith, the inner cryostat 514 comprising a liquid crystal polymer as hereinbefore described. The single phase superconductor 512 may of course be replaced with a multiphase superconductor as hereinbefore described in various previous embodiments. The inner cryostat 514 contains a cryogen 516 with which the superconductor 512 is in thermal communication via the inner cryostat 514.

The cable system 510 additionally comprises a second inner cryostat 530 surrounding the first inner cryostat 514 and again comprising a liquid crystal polymer of suitable composition, or other material depending on the operational functionality of the second inner cryostat 530. The second inner cryostat 530 defines a secondary lumen containing a second supply of the cryogen 516 to provide improved thermal performance. This second supply may comprise a different cryogen 516 to that contained within the first inner cryostat 514. An electrical and/or mechanical layer 528 may be provided between the superconductor 512 and the second inner cryostat 530.

A layer of thermal insulation 518 surrounds the second inner cryostat 530, while an outer cryostat 520 surrounds the insulated inner cryostats 514 and 530, with a vacuum annulus 522 defined therebetween and incorporating a centralising element 524.

Figure 7:
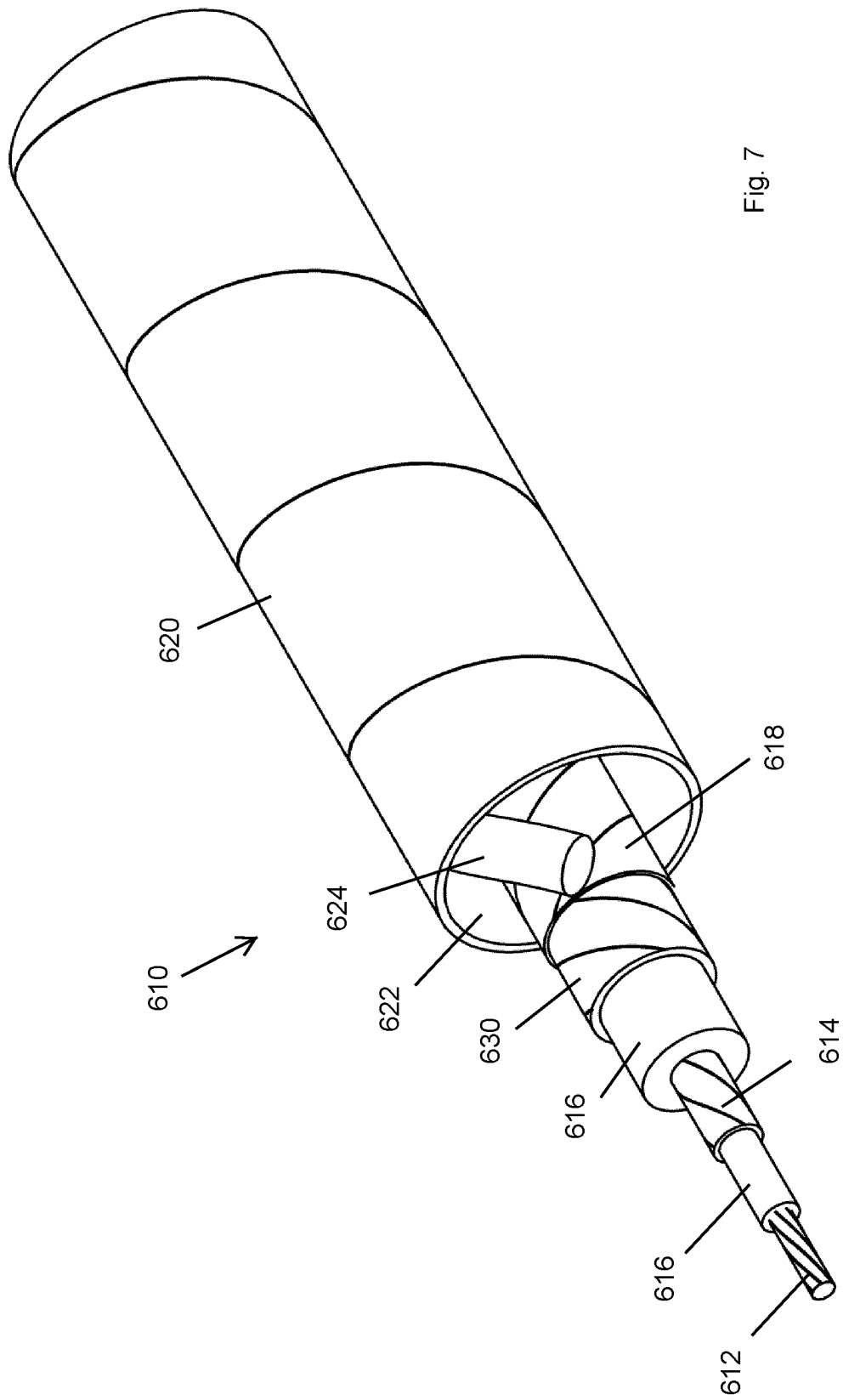
FIG. 7 illustrates a perspective view of a superconducting cable system according to a seventh embodiment of the present invention.

FIG. 7 illustrates a seventh embodiment of a superconducting cable system according to the present invention, generally indicated as 610. In this seventh embodiment like components have been accorded like reference numerals and unless otherwise stated perform a like function.

The cable system 610 comprises a single phase superconductor 612 of suitable form and extending longitudinally and preferably coaxially within the lumen of a first inner cryostat 614 filled with a cryogen 616. In this way the superconductor 612 is in direct and thermal communication with the cryogen 616 in order to maintain the requisite cryogenic temperature required for superconductivity. The single phase superconductor 612 may of course be replaced with a multiphase superconductor as hereinbefore described.

The cable system 610 additionally comprises a second inner cryostat 630 surrounding the first inner cryostat 614 and again comprising a liquid crystal polymer of suitable composition. The second inner cryostat 630 defines a secondary lumen containing a second supply of the cryogen 616 to provide improved thermal performance, which may be the same as or different to the cryogen 616 contained within the first inner cryostat 614 and which may be maintained at a different temperature. A layer of thermal insulation 618 surrounds the second inner cryostat 630, while an outer cryostat 620 surrounds the insulated inner cryostats 614 and 630, with a vacuum annulus 622 defined therebetween incorporating a centralising element 624.

Figure 8:
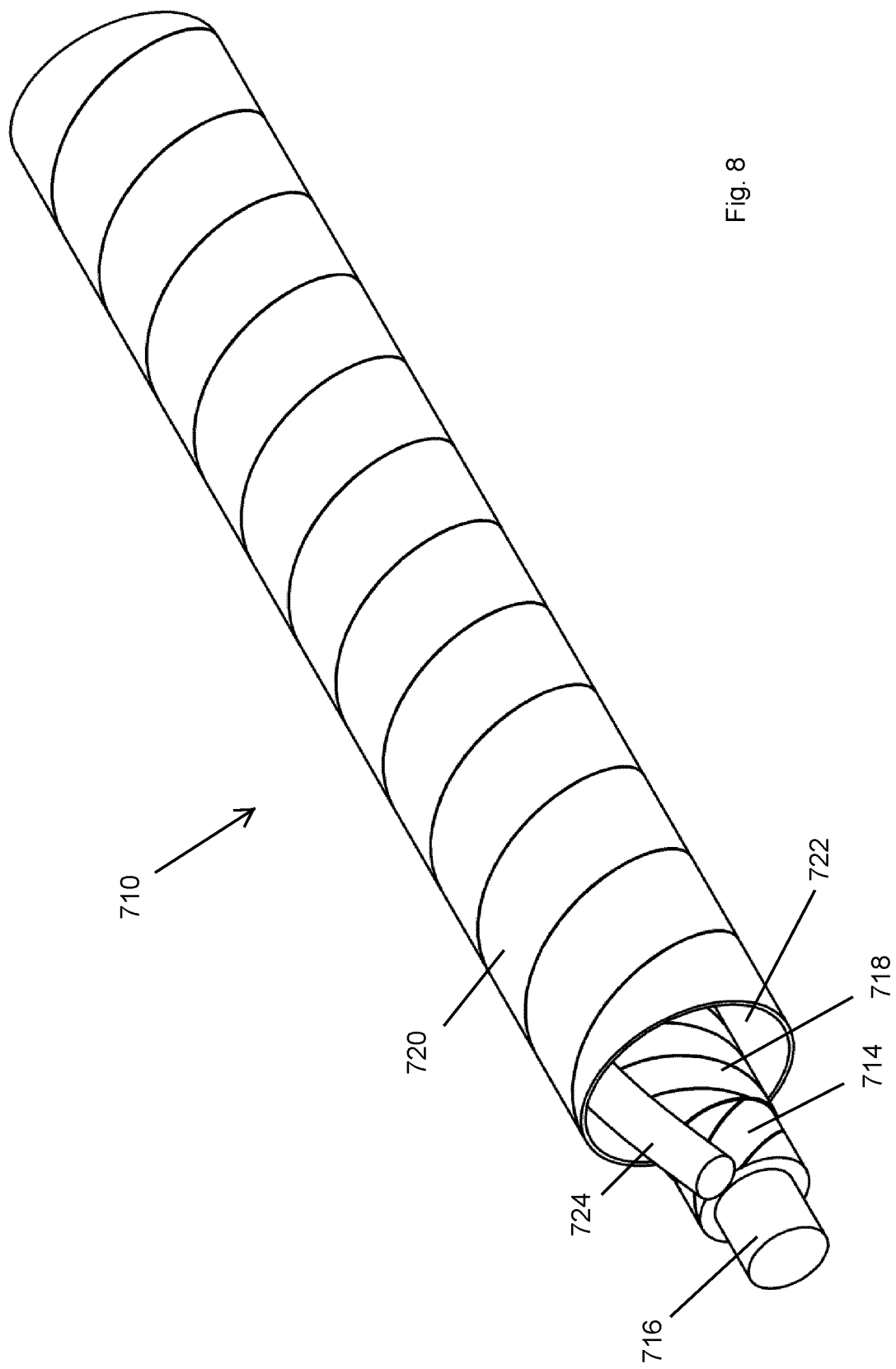
FIG. 8 illustrates a perspective view of a cryogen conduit according to an aspect of the present invention.

FIG. 8 illustrates an embodiment of a cryogen conduit according to an additional aspect of the present invention, generally indicated as 710, which utilises the general design and material properties of the superconducting cable system of the invention as hereinbefore described, but in the absence of a superconductor, and for the primary or hybrid purpose of transporting cryogenic fluid(s), for example but not limited to liquid nitrogen, liquid hydrogen, liquid helium, etc. This transport may include one or more supply paths or loops, and optionally a return path or loop, for example as described hereinafter with reference to the embodiment of FIG. 9. Like components have been accorded like reference numerals and unless otherwise stated perform a like function.

The cryogen conduit 710 comprises an inner cryostat 714 filled with a cryogen 716, the inner cryostat 714 comprising a liquid crystal polymer as hereinbefore described. A layer of thermal insulation 718 surrounds the inner cryostat 714, while an outer cryostat 720 surrounds the insulated inner cryostat 714, with a vacuum annulus 722 defined therebetween incorporating a centralising element 724.

Figure 9:
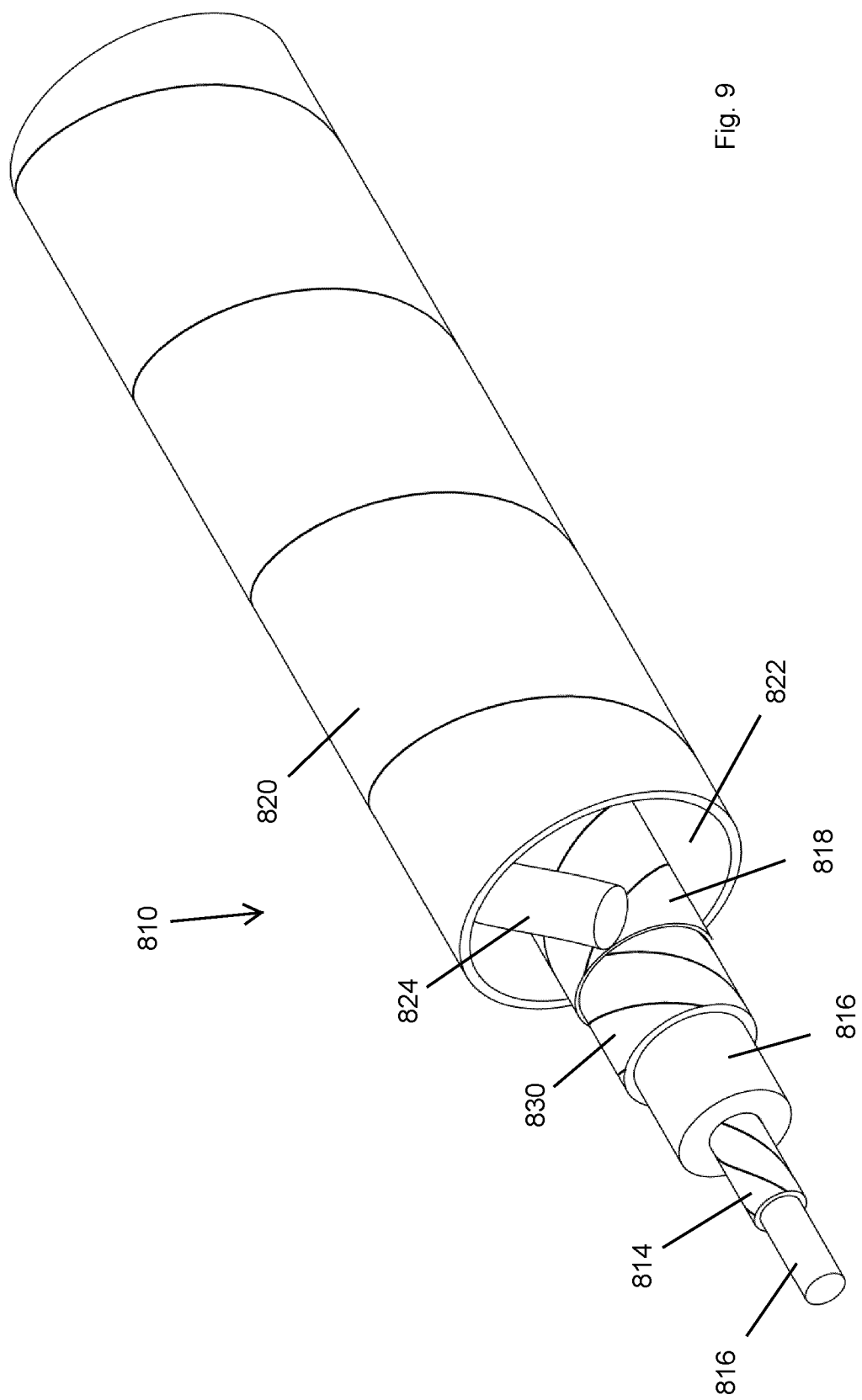
FIG. 9 illustrates a perspective view of an alternative embodiment of a cryogen conduit according to the present invention.

FIG. 9 illustrates a second embodiment of a cryogen conduit according to the present invention, generally indicated as 810. In this embodiment like components have been accorded like reference numerals and unless otherwise stated perform a like function.

The cryogen conduit 810 comprises a first inner cryostat 814 comprising a liquid crystal polymer as hereinbefore described, and containing a cryogen 816. The cryogen conduit 810 additionally comprises a second inner cryostat 830 surrounding the first inner cryostat 814 and again comprising a liquid crystal polymer of suitable composition. The second inner cryostat 830 defines a secondary lumen containing a second supply of the cryogen 816 to act as an initial cooling layer and thus provide improved thermal performance. This second supply may comprise a different cryogen 816 to that contained within the first inner cryostat 814. Alternatively the second inner cryostat 830 may defined a cryogen return path. A layer of thermal insulation 818 surrounds the second inner cryostat 830, while an outer cryostat 820 surrounds the insulated inner cryostats 814 and 830, with a vacuum annulus 822 defined therebetween incorporating a centralising element 824.

Figure 10:
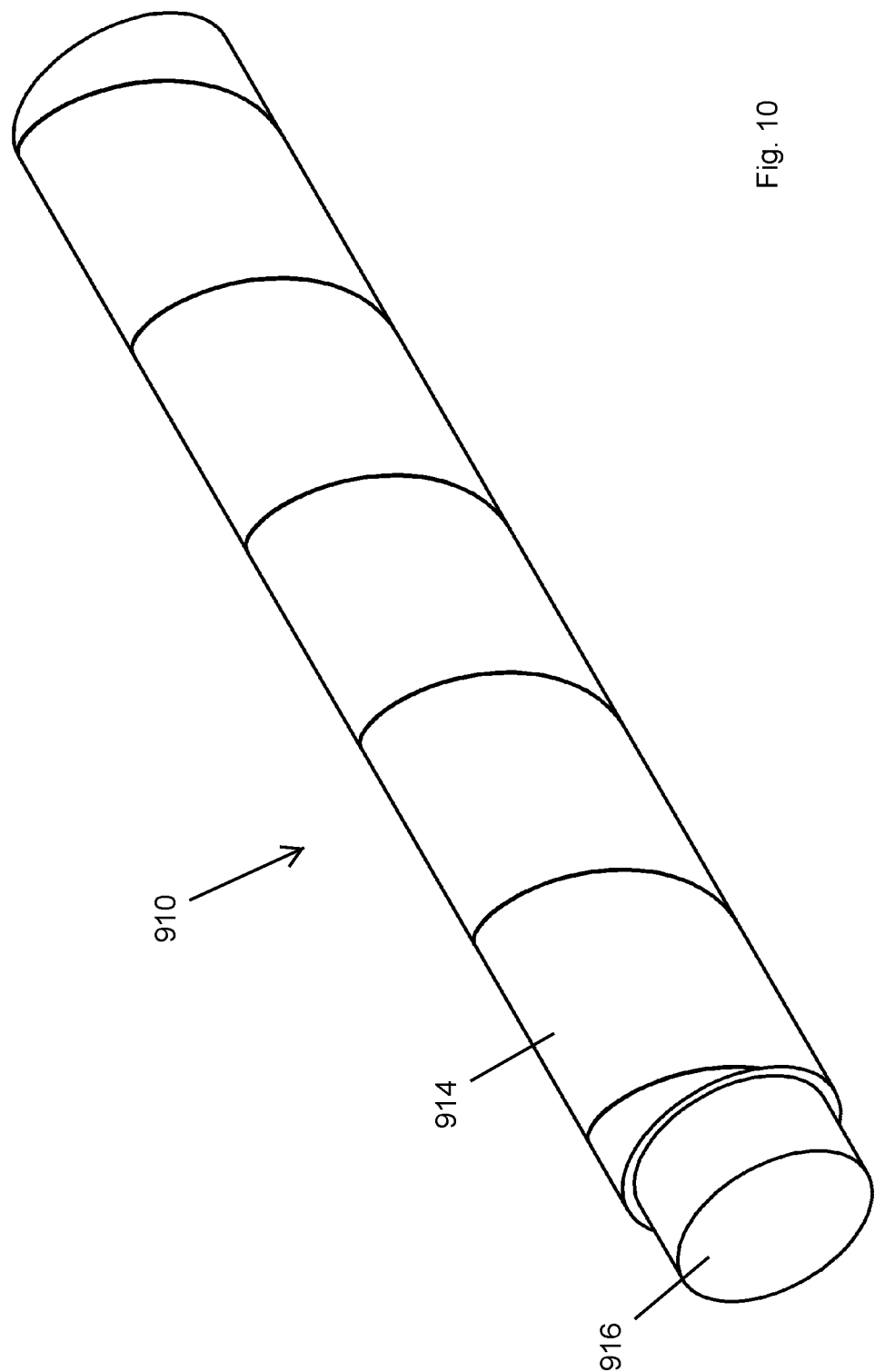
FIG. 10 illustrates a perspective view of a further alternative embodiment of a cryogen conduit according to the present invention.

FIG. 10 illustrates an alternative embodiment of a cryogen conduit according to the present invention, generally indicated as 910. In this embodiment like components have been accorded like reference numerals and unless otherwise stated perform a like function.

The cryogen conduit 910 comprises an inner cryostat 914 comprising a liquid crystal polymer as hereinbefore described, and containing a cryogen 916. The inner cryostat may be provided with one or more layers (not shown) of insulation as hereinbefore described, and is intended for use in the transport of liquid cryogens.

It is also envisaged that the superconducting cable system of the invention, as exemplified in the embodiments of FIGS. 1 to 7, could be used in a hybrid capacity to provide both superconductivity and/or to transport a liquid cryogen through one or more of the inner cryostats. Such transport could involve a cryogen supply path defined by one inner cryostat and a cryogen return path defined by another inner cryostat, or two separate cryogen supply paths for separate cryogens. This functionality could be undertaken while the cable system is operational and providing superconducting electrical transmission, or while the superconducting functionality is inactive and therefore solely to transport one or more cryogens. It is therefore to be understood that the materials, operating parameters, and functionality described above in relation to the superconducting cable system may be embodied in the cryogen conduit aspect of the invention as exemplified in FIGS. 8 to 10.

Thus the use of at least one inner cryostat formed form a liquid crystal polymer within a superconducting cable system or cryogen conduit facilitates the realisation of long distance superconducting and cryogenic fluid transport, with optimal structural properties for the application and a cheaper life cycle than current and potential alternatives.

The invention claimed is:

1. A superconducting cable system comprising at least one inner cryostat comprising an extruded pipe having a smooth bore; a supply of cryogenic fluid within a lumen of the at least one inner cryostat; and at least one superconductor extending longitudinally of the at least one inner cryostat and in thermal communication with the cryogenic fluid; wherein the at least one inner cryostat comprises a liquid crystal polymer.

2. A superconducting cable system according to claim 1 in which the liquid crystal polymer comprises a thermotropic liquid crystal polymer.

3. A superconducting cable system according to claim 1 in which the liquid crystal polymer comprises an aromatic ester comprising aromatic dicarboxylic repeating units and/or aromatic hydroxycarboxylic repeating units and/or repeating units derived from aromatic diols, aromatic amides and/or non-aromatic monomers.

4. A superconducting cable system according to claim 1 in which the liquid crystal polymer comprises at least one filler.

5. A superconducting cable system according to claim 1 in which the at least one filler is selected from zirconium tungstate, chopped glass fibres, chopped PTFE fibres, chopped carbon fibres, chopped liquid crystal polymer fibres, carbon nanofibers, aramid nanofibers, nanotubes, boron nitride and graphene nanoparticles.

6. A superconducting cable system according to claim 5 in which the one or more fillers comprise from 0.1 to 40% of the volume of the liquid crystal polymer.

7. A superconducting cable system according to claim 1 in which the liquid crystal polymer has a coefficient of thermal expansion of less than $10\ e^{-6}/C$.

8. A superconducting cable system according to claim 1 in which the liquid crystal polymer has a permeability of less than $1 \times 10^{-12}\ cm^3 \cdot cm/cm^2/s/bar$.

9. A superconducting cable system according to claim 1 in which the liquid crystal polymer has a dielectric strength of between 0 kV/mm and 40 kV/mm.

10. A superconducting cable system according to claim 1 in which the liquid crystal polymer has a failure strain at break of between 1% and 20%.

11. A superconducting cable system according to claim 1 in which the liquid crystal polymer has a minimum service temperature of between 4 and 90 degrees Kelvin.

12. A superconducting cable system according to claim 1 in which the liquid crystal polymer has a thermal conductivity of less than 0.5 W/mk.

13. A superconducting cable system according to claim 1 in which the liquid crystal polymer has a yield strength of greater than 25 MPa.

14. A superconducting cable system according to claim 1 in which the liquid crystal polymer has a stiffness of between 1 and 100 GPa.

15. A superconducting cable system according to claim 1 in which the at least one superconductor is in retained within a lumen of the at least one inner cryostat.

16. A superconducting cable system according to claim 1 comprising a first inner cryostat and a second inner cryostat surrounding the first inner cryostat.

17. A superconducting cable system according to claim 1 in which the second inner cryostat comprises a liquid crystal polymer.

18. A superconducting cable system according to claim 16 in which the second inner cryostat comprises a smooth bore.

19. A superconducting cable system according to claim 1 comprising an outer cryostat enclosing the at least one inner cryostat.

20. A cryogen conduit comprising at least one inner cryostat comprising an extruded pipe having a smooth bore; a supply of cryogenic fluid within a lumen of the at least one inner cryostat; wherein the at least one inner cryostat comprises a liquid crystal polymer.

* * * * *